No. 734,344. PATENTED JULY 21, 1903.
J. A. LUETHY.
PACKING MECHANISM.
APPLICATION FILED NOV. 1, 1900.
NO MODEL.
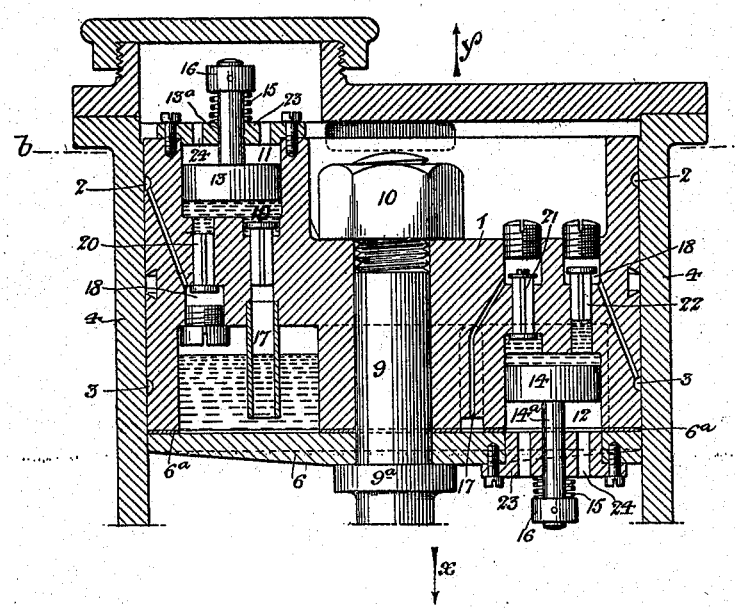
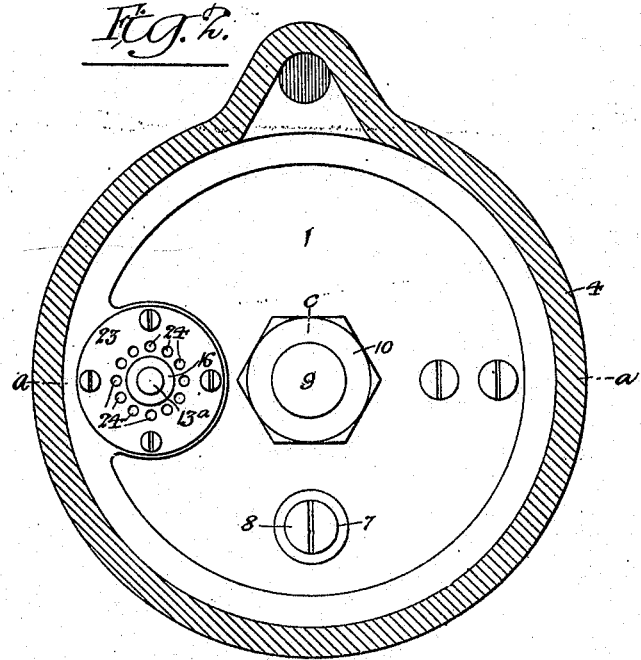 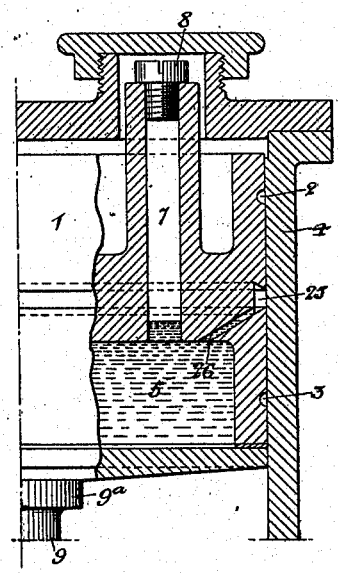
Witnesses:
Inventor:
Jacob Adolf Luethy,
by his Attorneys;

No. 734,344. Patented July 21, 1903.

UNITED STATES PATENT OFFICE.

JACOB ADOLF LUETHY, OF CAMDEN, NEW JERSEY.

PACKING MECHANISM.

SPECIFICATION forming part of Letters Patent No. 734,344, dated July 21, 1903.

Application filed November 1, 1900. Serial No. 35,159. (No model.)

*To all whom it may concern:*

Be it known that I, JACOB ADOLF LUETHY, a citizen of the Republic of Switzerland, and a resident of Camden, in the county of Camden, State of New Jersey, have invented certain Improvements in Packing Mechanism, of which the following is a specification.

My invention relates to certain improvements in packing mechanism applicable for packing pistons in their cylinders, piston-rods in their stuffing-boxes, and other moving members controlled directly by motive fluid under pressure, which members have bearing-surfaces subject to leakage of such motive fluid. The bearing-faces of such moving members are packed by a suitable fluid packing medium which is caused to circulate around the parts under suitable pressure and within certain limits, preferably defined by grooves formed in one or both surfaces of the members to be packed, by the improved mechanism forming the subject of my invention.

The objects of my invention are, first, to provide mechanism for forcing a packing medium between the surfaces to be packed that will be actuated by the motive fluid controlling the operation of the moving member, such packing following closely any unevenness of the surfaces, filling the leakage-space and effectually closing the same; second, to provide mechanism for effecting the improved method of packing economically, and, third, to secure a gain of efficiency in the working power of the members operated upon and at the same time increase the term of usefulness of said members.

In other words, my invention consists in providing mechanism operated through the motive fluid for the moving medium of the motive fluid for the moving member for actuating a frictionless packing medium that will entirely prevent escape of motive fluid and which will at the same time cool and lubricate the moving member or members and their bearing-surfaces.

My invention is fully illustrated in the accompanying drawings, in which—

Figure 1 is a sectional view of a piston embodying one method of carrying my invention into effect, taken on the line *a a*, Fig. 2. Fig. 2 is a plan view of said piston, the cylinder being shown in section on the line *b b*, Fig. 1; and Fig. 3 is a sectional view of part of the piston, taken on the line *c c*, Fig. 2.

Instead of having a piston or stuffing-box provided with spaces for soft packing-rings or having recesses for solid or metal packing-rings I provide the bearing-surface of the piston or stuffing-box with a groove or in some instances a series of grooves so arranged that such groove or grooves will be continuous and cover the entire surface traversed by the moving member, which comprises the space or outlet the motive fluid would accept in its attempt to escape. Through this groove a suitable fluid packing medium— such as oil, water, air, or steam—is conveyed under suitable pressure during the presence of the motive fluid in the adjacent chamber. For economy in using the fluid packing medium the grooves for confining the same have no exit, but are continuous from end to end. Where it is desired to cool as well as lubricate and pack the meeting faces of the fixed and moving members, however, the grooves should be so arranged that the packing medium may be circulated through the same.

The fluid packing medium may be supplied by any suitable pumping mechanism, or a reservoir or tank may be arranged at a convenient point. If a tank is employed, it should have a discharge-outlet communicating with the groove to contain the packing stream. The supply of packing medium should be abundant, so that the desired pressure may be maintained in order that any discharge from the grooves used to pack the leakage can be properly supplemented. This discharge is an essential part of my improved packing method, as it insures the filling of the entire space, no matter in what condition it may be, around the piston or piston-rod, &c., when such members are in their proper relative position. With the old method of packing with rings of solid substance any unevenness of the surface could only be bridged, but not filled.

The method of packing forming the subject of my invention can also be applied in connection with packing-rings or other forms of solid packing, and such procedure is to be recommended when the surfaces to be packed are improperly constructed or much worn.

If the pressure of motive fluid is high, the application of several streams of the packing medium is advisable, and by having the pressure of such streams successively lower as they are placed farther away from the end of the stuffing-box adjacent to the chamber containing the motive fluid such packing streams will be exposed to only a fractional part of the pressure of such motive fluid, thus saving the cohesive and adhesive qualities of the fluid or other substance forming such packing medium. Thickish oil (cylinder-oil) possessing compactness and good antifriction qualities is the preferred fluid to be employed as a packing medium. In cases where the application of several packing streams for simultaneous action is desired the use of different packing mediums may give better results—as, for instance, in a gas-engine of the Otto type the application of two separate streams of packing fluid, one of oil and one of water, to simultaneously pack the engine-piston would give good results and besides this lubricate and effectually cool the cylinder-wall and piston.

For use with the engines of automobiles one packing stream of air in connection with the packing stream of oil would pack, cool, and lubricate the moving parts of the same without increasing the weight to be carried by the automobile.

The advantage of my improved method of packing the moving parts of all types of engines and other mechanism as compared with the old method of packing is at once apparent in the prevention of the escape of motive fluid. It is further apparent in the remarkable reduction of friction, which is always present with metal packing-rings or other solid forms of packing, and finally in the liberal lubrication provided by my improved method, which insures freedom from friction of those parts usually carrying the ordinary packing.

In carrying out my invention according to one part of the same—that is to say, as applied to pistons in their cylinders—I provide the peripheral face of the piston with a series of grooves to receive a constant supply of the fluid forming the packing medium and mount in the head of the piston a reservoir containing such fluid, with pumps communicating with said reservoir and so arranged that they will act when the piston is moving in either direction.

In Figs. 1, 2, and 3 of the accompanying drawings, 1 represents a piston adapted for use in a vertical steam-engine, having a series of grooves 2 and 3 cut in the peripheral face of the same, which is in nominal contact with the walls of the cylinder 4. Within the piston a reservoir 5 is provided, closed on one side by a suitable cap-plate 6 and having an inlet-tube 7 closed by a screw-plug 8. This piston is secured to the rod 9 by an ordinary nut 10, said rod having a shoulder $9^a$ resting against one side of the piston, and said nut serves also to hold the cap-plate 6 in position, a packing-gasket $6^a$ being preferably interposed between said plate and the piston. In each face of the piston recesses or chambers 11 and 12 are formed, to which are adapted the pump-pistons 13 and 14, which upon the movement of the main piston 1 discharge from said chambers 11 and 12 the packing and lubricating medium which has entered the same from the reservoir 5—that is to say, when the piston is moving in the direction of the arrow $x$ the motive fluid propelling the same acts upon the piston 13 and causes it to force out the fluid within the chamber 11. When the piston is moving in the direction of the arrow $y$, the same action is taking place with regard to the piston 14, and the piston 13, acting under the pressure of the spring 15, which is interposed between the plate covering the chamber 11 and a collar 16, carried by the piston-rod $13^a$, causes said chamber to fill with the packing medium below said piston. Communicating with these chambers 11 and 12 are the passages 17 and 18, the latter serving as a means of communication between the chamber and the grooves 2 and 3 of the piston, while the former afford communication between the piston-chambers and the reservoir. The passage 17, leading to the piston-chamber 11, is controlled by the valve 19, and the passage 18, leading to the groove 2, is controlled by the valve 20, while the passages having the same relation to the piston-chamber 12 are controlled by the valves 21 and 22. Covering the chambers 11 and 12 are plates 23, through which the piston-rods $13^a$ and $14^a$ pass, and each of said plates has openings 24 for the free passage to said chambers 11 and 12 of the motive fluid within the cylinder 4 which controls the movement of the main piston 1. Each of the piston-rods $13^a$ and $14^a$ has a collar 16 at its end, and between said collars and the plates 23 springs 15 are interposed, which serve to return said pistons to their normal positions after they have been acted upon by the motive fluid within the cylinder 4.

The operation of my device is as follows: If the main piston 1 be moved in the direction of the arrow $x$, the motive fluid moving the same enters the chamber 11 through the openings 24 and acting upon the piston 13 within said cylinder forces out the packing medium collected within the same from the reservoir through the passage 18 to the groove 2 of the piston. The packing medium circulating within the groove 2 under pressure will effectually pack the piston within the cylinder and lubricate the piston at the same time. Upon the return stroke of the piston the same action will take place with regard to the chamber and piston 12 and 14, the lubricating and packing medium therein being discharged to the groove 3 in the peripheral wall of the piston through the passage 18. The surplus packing medium which has been discharged into the groove 2 during the forward movement of the main piston and which has covered the wall of the cylinder is collected by a groove 25, cut in the center of the peripheral wall of the piston, on the return stroke of the same and is conveyed by a series of passages 26 to the reservoir 5 of the piston. By this means there is no waste of the oil and effectual packing and lubricating means is provided.

By discharging the stream of packing medium to the groove 2 when the piston is moving in the upward direction and to the groove 3 when the piston is moving in the downward direction any leakage of such streams of packing medium will be directed toward the annular groove 25, where said discharges collect and by gravity are brought into the reservoir 5 to be used again in the process of packing.

For some work it may be desirable to have the packing medium under constant pressure. In other instances it may be desirable to have the pressure only when the motive fluid is adjacent to and acting against the portion of the structure to be packed.

Having thus described my invention, I claim and desire to secure by Letters Patent—

1. The combination of a fixed structure having a bearing-surface, a moving structure actuated by fluid under pressure and having a bearing-surface in contact with that of the fixed structure, such members being designed to work together without leakage past the joint bearing-surface, and having chambers for the reception of a fluid packing medium for such surface, and means carried by one of said members for forcing such packing medium between said bearing-surfaces, the pressure on the packing medium rising and falling with the pressure of the motive fluid upon the moving structure.

2. The combination of a fixed structure having a bearing-surface, a moving structure actuated by fluid under pressure and having a bearing-surface in contact with that of the fixed structure, such members being designed to work together without leakage past the joint bearing-surface, and having chambers for the reception of a fluid packing medium for such surface, and means carried by one of said members for forcing such packing medium between said bearing-surfaces, the pressure on the packing medium rising and falling with the pressure of the motive fluid upon the moving structure, whereby the greatest pressure upon said packing medium will be coincident with the greatest pressure upon the moving structure, thereby effectually packing the space between the fixed and moving structure and preventing leakage past the same.

3. The combination of a fixed structure having a bearing-surface, a moving structure actuated by fluid under pressure and having a bearing-surface in contact with that of the fixed structure, such members being designed to work together without leakage past the joint bearing-surface, and having chambers for the reception of a fluid packing medium for such surface, means carried by one of said members for forcing such packing medium between said bearing-surfaces, and means for actuating such forcing means by the operation of the moving structure, the pressure on the packing medium rising and falling with the pressure of the motive fluid upon the moving structure.

4. The combination of a fixed structure having a bearing-surface, a moving structure having a bearing-surface, such members designed to work together without leakage past the joint bearing-surface, and having chambers for the reception of a fluid packing medium, one of said members having grooves formed in its bearing-surface, and means carried by one of said members for forcing the packing medium into said grooves to fill the space between the bearing-surfaces, the pressure on the packing medium rising and falling with the pressure of motive fluid upon the moving structure.

5. The combination of the fixed structure having a bearing-surface, a moving structure having a bearing-surface, such members designed to work together without leakage past the joint bearing-surface, and having chambers for the reception of a fluid packing medium, one of said members having grooves formed in its bearing-surface, means carried by one of said members for forcing the packing medium into said grooves to fill the space between the bearing-surfaces, and means for actuating such forcing means by the operation of the moving member, the pressure on the packing medium rising and falling with the pressure of motive fluid upon the moving structure.

6. The combination of the fixed structure having a bearing-surface, a moving structure having a bearing-surface, such members designed to work together without leakage past the joint bearing-surface, said moving structure having grooves formed in its bearing-surface, and having chambers containing fluid packing medium, such chambers being in communication with said grooves, pumps carried by said moving member and actuated as said member is traversed back and forth to force the packing medium between the bearing-surfaces, and valves controlling the passages from the chambers, said valves opening and closing automatically as the direction of movement of the moving member is changed.

7. The combination of the casing or cylinder, a main piston adapted to move within the same having grooves formed in the bearing-face of the same, and having chambers containing a fluid packing medium, passages leading from said chambers to the grooves of the piston, auxiliary pump-pistons carried by the main piston and adapted to move in said chambers whereby as the main piston is moved, the packing medium will be forced to the annular grooves of said piston, means for returning said pump-pistons to their normal positions, and valves controlling the passages from the chambers containing the packing medium to the grooves of the main piston.

8. The combination of the cylinder, a main piston within said cylinder, said piston having grooves cut in the bearing-face of the same, and having chambers in communication with said grooves, said chambers carrying a fluid packing medium, pump-pistons for forcing the fluid packing medium into the grooves of the main piston, said piston having a collecting channel or groove arranged at the center of the same midway of the packing-grooves and adapted to receive the surplus packing medium, said piston having also a reservoir for the reception of the packing medium, which reservoir is open to this central groove, and valves controlling the passages leading from the pump-chambers to the packing-grooves of the main piston.

In testimony whereof I have signed my name to this specification in the presence of two subscribing witnesses.

J. ADOLF LUETHY.

Witnesses:
JOHN R. WOLFE,
JOSIAH S. PEDRICK.